(12) United States Patent
De Backer

(10) Patent No.: US 6,334,550 B1
(45) Date of Patent: Jan. 1, 2002

(54) DOSE MEASURING APPARATUS FOR DISTRIBUTING A LIQUID

(76) Inventor: Jan De Backer, Callaertstraat 1, 9100 Sint-Niklaas (BE)

( * ) Notice: Subject to any disclaimer, the term of this patent is extended or adjusted under 35 U.S.C. 154(b) by 0 days.

(21) Appl. No.: 09/674,153
(22) PCT Filed: Apr. 24, 1998
(86) PCT No.: PCT/BE98/00059
§ 371 Date: Oct. 27, 2000
§ 102(e) Date: Oct. 27, 2000
(87) PCT Pub. No.: WO99/60348
PCT Pub. Date: Nov. 25, 1999

(51) Int. Cl.$^7$ ................................................. G01F 11/28
(52) U.S. Cl. .......................... 222/205; 222/207; 222/438
(58) Field of Search .......................... 222/29, 205, 207, 222/211, 215, 434, 438, 439, 440

(56) References Cited

U.S. PATENT DOCUMENTS 5,363,991 A * 11/1994 Reyman ..................... 222/207

FOREIGN PATENT DOCUMENTS

| DE | 19603707 | 8/1997 |
|----|----------|--------|
| EP | 0335505  | 10/1989 |
| EP | 0809091  | 11/1997 |
| WO | 8903362  | 4/1989 |
| WO | 9603625  | 2/1996 |
| WO | 9607599  | 3/1996 |

* cited by examiner

Primary Examiner—Joseph A. Kaufman
Assistant Examiner—Patrick Buechner
(74) Attorney, Agent, or Firm—Dykema Gossett PLLC

(57) ABSTRACT

A dose measuring apparatus which enables an accurate dosing of a liquid includes two cylindrical sleeves, namely a lower part which is completely closed at the bottom and serves as reservoir for collecting the amount of liquid to be closed, and an upper part which is screwed on to the lower part and is provided with a pouring orifice.

15 Claims, 8 Drawing Sheets

DOSE MEASURING APPARATUS FOR DISTRIBUTING A LIQUID

BACKGROUND OF THE INVENTION

1. Field of the Invention

This invention relates to a dose measuring apparatus for distributing a liquid in predetermined doses, consisting of a beaker-shaped can which serves as reservoir for collecting the amount of liquid to be dosed.

Its most important application is in the accurate dosing of liquid medicines (both for human and veterinary medicine application). It can be extended for dosages of all liquids from whatever field.

2. The Prior Art

Through WO 96/07599 a packaging for liquid detergent is known, which is equipped with an adjustable dose measuring device for liquid. The dose measuring device is built into the packaging and serves as dispenser of an adjustable amount of liquid detergent. The dose measuring device comprises an adjustable upper plate that can be slid along the inside of the recipient in order to alter the height of a partition chamber just prior to use of the recipient, through which the dose of liquid detergent to be distributed is set.

This dose measuring device is satisfactory for detergents but is far from sufficiently accurate and reliable for dosing medicines.

Furthermore the recipient has to be completely turned upside down when pouring the amount of liquid, which is neither practical nor hygienic, because the recipient is heavy and because impurities which can be present on the outside of the packaging, can fall into the poured medicine.

SUMMARY OF THE INVENTION

This invention aims at remedying these disadvantages as well as providing an attractive and reliable solution to the problem of hygienic and easy distribution in equal and reproducible doses of liquid medicinal compounds. The task is implemented according to this invention by means of a dose measuring apparatus with a recipient for liquid, in which the volume is accurate, through the removal by suction of the liquid which is situated above a specific level.

The dose measuring apparatus according to the invention, which enables an accurate dosing of a bottled liquid comprises:

a) a means for hermetically mounting the dose measuring apparatus on a bottle;

b) a reservoir with a bottom;

c) a means that forms a channel or tube, whereby this channel or tube extends between a lower opening which is designed to be inserted into the liquid of the bottle and an upper opening which is in the reservoir, at least at a level that is remote from the bottom, and whereby a part of this channel or tube is at a level above the bottom of the reservoir and above the upper opening, whereby through the exertion of a pressure in the bottle or of an underpressure in the reservoir, liquid flows from the bottle through the channel or tube to the reservoir, while as soon as or after this pressure or underpressure is no longer exerted, the liquid, which is in the reservoir above the level of the upper opening of the channel, is removed by suction to the bottle via the channel or tube and via the part thereof that is at a level above the upper opening, through which after that removal by suction, an accurate volume of liquid in the reservoir is determined between the bottom of the reservoir and the level of the upper opening.

For example, a part of the channel or tube is at a level that lies at least 0.1 cm, preferably at least 0.3 cm, above the level of the upper opening. In particular, this part is at a level that lies at lest 0.5 cm above the level of the upper opening.

The suction power for the through flow of the liquid from the reservoir to the bottle, must therefore exceed the gravity of the liquid which lies between the upper opening and the upper part of the channel or tube.

As soon as the level of the liquid in the reservoir nearly corresponds to the level of the upper opening, the liquid is no longer removed by suction from the reservoir via the upper opening of the channel or tube.

If the level of the upper opening of the channel remains constant in relation to the bottom of the reservoir, the dose measuring apparatus according to the invention is designed to dose a specific volume of liquid.

Preferably, the level of the upper opening of the channel or tube can be adapted in relation to the bottom of the reservoir, so that the volume of liquid to be dosed is adjusted in accordance.

The dose measuring apparatus is therefore preferably provided with a means for adjusting the level of the upper opening in relation to the reservoir, whereby in the reservoir, the volume between the bottom and the upper opening of the channel or tube is adjusted.

According to an embodiment the apparatus, according to the invention, is provided with a cutoff means in order to prevent the through flow of liquid from the bottle to the reservoir. This is suitable for pouring liquid out of the reservoir as well as for transporting and/or storing a liquid in a bottle which is provided with an apparatus according to the invention.

According to a detail of an embodiment the channel is provided with a cutoff means in order to prevent the through flow of liquid from the bottle to the reservoir.

According to a specific embodiment the channel consists of at least two parts, whereby the above mentioned parts are movably connected in relation to each other, so that, through the movement of the parts in relation to each other, the level of the upper opening of the channel in the reservoir can be adjusted in relation to the bottom of the reservoir.

According to a possible embodiment the bottom of the reservoir is movably mounted in relation to the means that forms the channel or tube.

According to an advantageous embodiment the reservoir is provided with an inner sleeve whereby that inner sleeve has an upper wall with an opening and a side wall, whereby that side wall forms a wall of the reservoir and extends between the bottom of the reservoir and the upper wall. The channel consists of a first part and a second part, whereby the first part extends between the lower opening of the channel and the opening of the upper wall, while the second part consists of a sleeve which extends between an open extremity and a closed-off extremity, whereby the sleeve of the second part has a wall which is directed towards the side wall of the first sleeve which is at least partially remote from that side wall in order to form a passage between the tenon extremity and the opening of the upper wall.

For example the dose measuring apparatus consists of a cylindrical lower part, a cylindrical upper part and a pipe, whereby the lower part comprises a cylindrical outer sleeve and a bottom in order to form a reservoir of a dosed amount of liquid, as well as an inner sleeve with an upper wall with an opening, on which an extremity of the pipe is mounted in order to form the first part of the channel, while the upper part is rotatably mounted on the lower part and has a surface that is provided with a cylindrical outer sleeve and with a concentric sleeve with an open extremity and a closed extremity, whereby the inner sleeve of the lower part is inserted at least partially into the concentric sleeve and whereby, between the concentric sleeve and the inner sleeve, the second part of the channel is formed, along which liquid in the reservoir is sent via the bottle or liquid from the reservoir is removed by suction to the bottle. The upper part is connected to the lower part by means of a screw mechanism, whereby the outer sleeve of the upper part connects to the outer sleeve of the lower part, so that through the turning of the upper part in relation to the lower part the concentric sleeve is moved upwards or downwards along the inner sleeve in order to move the open extremity of the concentric sleeved and in order to define a specific dose volume of the reservoir under this open extremity of the concentric sleeve.

The rotatable upper part can serve as stopper of the bottle, because it has a conoid on the inside, when it is completely closed tight on the lower part of the doser, which in its turn is screwed down or snapped onto the bottle, can hermetically seal off the only passage of the lower part, so that possible volatile substances in the recipient have no chance of evaporating and are not lost.

According to a distinctive feature of the invention, the dose measuring apparatus comprises a rotatable upper part, fastening in leak-proof manner on to the inner wall of the lower part that serves as reservoir. The rotatable upper part comprises a crescent-shaped pouring orifice and a cylindrical hole opposite this pouring orifice, in order to facilitate pouring.

In a special embodiment the doser is closed off on top, with the exception of the pouring orifice and the cylindrical hole. The lower part of the doser, which serves as reservoir, centrally has a cylindrical sleeve with on top the only opening for allowing the liquid through. This opening is in communication via a pipe with the product contained in the bottle. The pipe is provided with a U-shaped notch and preferably makes contact with the bottom of the bottle, in order to use the contents of the bottle right to the end. The bottom part of the lower part runs obliquely upwards to the cylindrical sleeve, through which a very small dose can already be obtained.

According to a development of the invention the upper part consists of a rotatable screw sleeve, of which the outside connects to the inner wall of the lower part, and the inner sleeve serves as guide round the cylindrical sleeve of the lower part, along which the liquid in the reservoir is sent, and in case of overdosing is sucked along the same way back into the bottle.

The outer ring of the upper part is provided on the inside with an injection moulded screw thread, through which the upper part by manually turning to the left or to the right, can be moved downwards or back upwards along the wall of the lower part that serves as reservoir. The screw thread is provided with grooves, as many as dose settings are desired. By exerting manual pressure on the bottle, with the product contained, this latter is driven via the pipe, which is connected to the beaker-shaped lower part, through the opening of the lower part, through which the liquid in the zone between the inner sleeve of the lower part and the inner sleeve of the upper part flows into the reservoir. The desired dose volume ensures that the excess of liquid above the set dose volume is sucked through the created under- or overpressure back via the same way into the bottle.

On the upper edge of the outer periphery of the lower part there is an injection moulded tooth, which through the turning to the left or right of the upper part gives rise to a click position, each time when the tooth reaches a groove.

The upper part is provided on the outside with a ribbed structure, in order to obtain a better grip when dosing.

The lower part can be printed with the necessary dosage. Since the printing has no contact with the product contained, no registrations are necessary with regard to the food compatibility of the printing.

The dose measuring apparatus for liquids according to the invention has at least one of the following advantages:

depending on the application a large number of doses can be provided;

depending on the concept very small doses can be provided;

the distance between the successive doses can be kept very small;

great dose accuracy (enhanced by the built-in click position);

stop position which ensures that the doser can be hermetically sealed off, so that possible volatile substances in the bottle have no chance of evaporating;

suitable for all liquids which have to be dosed in whatever branch of industry, with a special mention for pharmaceutical applications (human and veterinary medicine);

possibility of printing on the outside of the reservoir, without the product contained coming into contact with the printing.

In order to facilitate the operation of the beaker-shaped pouring can, the pouring orifice is fitted with a spout.

Grooves on the screw thread of the screw sleeve make it possible to adjust the desired dose volume.

The beaker-shaped can is attached to a vessel or bottle by means of a screw thread or a snap connection.

The rotatable upper part and the beaker-shaped can of the dose measuring apparatus are manufactured out of injection moulded parts.

These and other characteristics and distinctive features of the embodiments of dose measuring apparatuses, according to the invention, will ensue from the following description in which reference is made to the drawings attached hereto.

BRIEF DESCRIPTION OF THE DRAWINGS

These drawings are.

In these figures the same reference symbols denote the same or similar or similar elements.

DETAILED DESCRIPTION OF THE PREFERRED EMBODIMENTS

Figure 1:
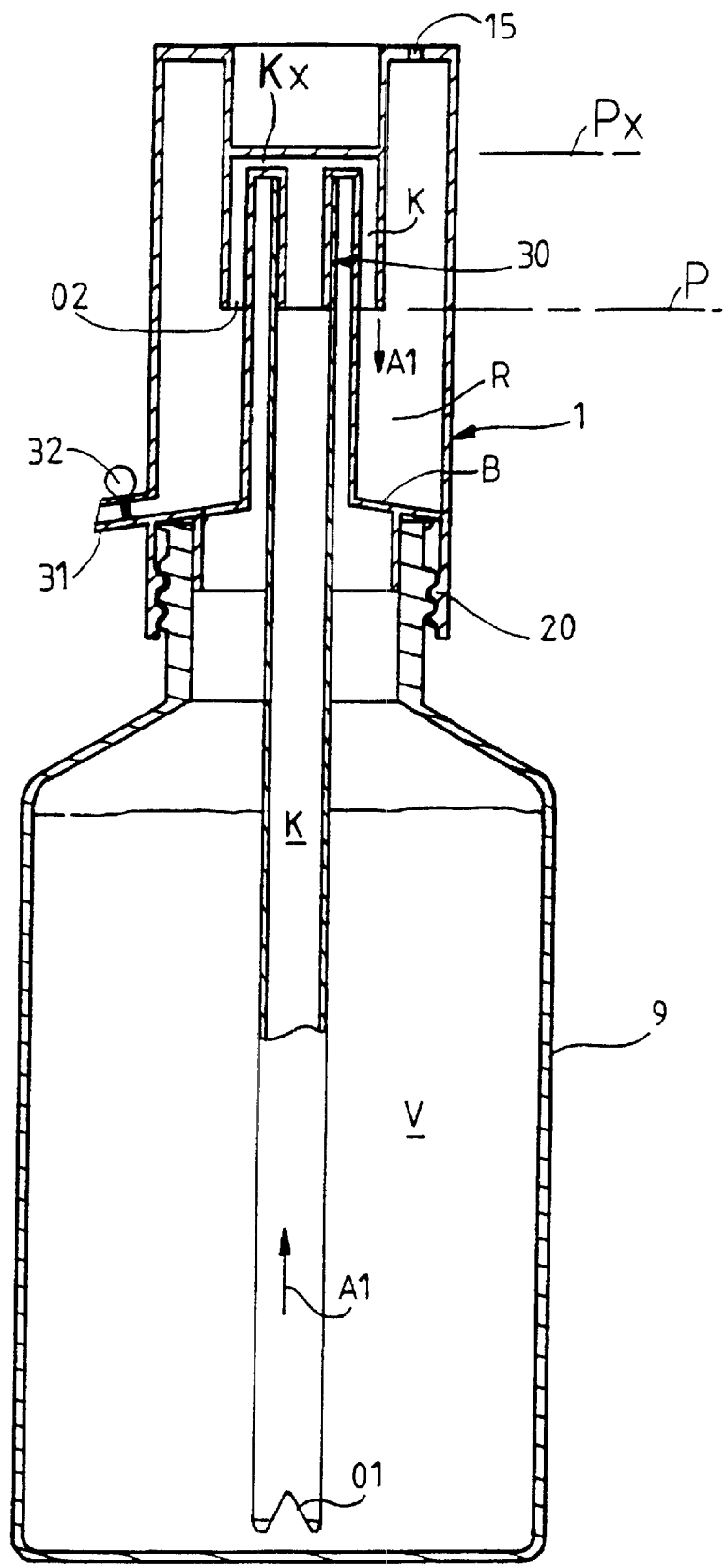
FIG. 1 is a cross-section of a first embodiment of a bottle with a dose measuring apparatus according to the invention.

FIG. 1 shows a first embodiment of a dose measuring apparatus 1 for the accurate dosing of a bottled liquid.

This apparatus 1 is provided with:
a) a means 20 (such as a screw thread) for hermetically mounting the dose measuring apparatus 1 on a bottle 9;
b) a reservoir R with a bottom B;
c) a means that forms a channel K, whereby this channel extends between a lower opening 01 which is designed to be inserted into the liquid V of the bottle 9 and an upper opening 02 which is in the reservoir R, at least at a level P that is remote from the bottom, and whereby a part of this channel KX is above the bottom B of the reservoir R and above the upper opening 02, whereby through the exertion of a pressure in the bottle (e.g. by pressing the supple wall of the bottle) or of an underpressure in the reservoir (e.g. by the removal by suction of air through the opening 15), liquid V flows from the bottle 9 through the channel K to the reservoir R, while as soon as or after this pressure or underpressure is no longer exerted, the liquid V, which is in the reservoir R above the level P of the upper opening 02 of the channel K, is removed by suction to the bottle through the channel K. through which after that removal by suction, an accurate volume of liquid V in the reservoir R is determined between the bottom B of the reservoir and the level P of the upper opening 02.

The reservoir R is provided with an outlet pipe 31 that is provided with a cutoff means 32. By opening the cutoff means 32 the liquid can flow out of the reservoir R.

Through the exertion of a pressure on the bottle 9 and a deforming of the bottle, the liquid V flows through the channel K to the reservoir R. (arrow A1).

As soon as the reservoir R is filled with liquid to above the level P, no pressure is exerted on the bottle any more, so that the bottle takes it original form. A suction removal force A2 is then implemented by the bottle. The liquid which is in the reservoir above the level P is then removed by suction to the bottle 9. As soon as the liquid reaches the level P in the reservoir, air is sucked away.

The upper part of the part KX of the channel or tube, is at a level PX which is preferably situated 1 cm above the level P.

The dose measuring apparatus according to FIG. 1 serves for accurately determining a dose of liquid.

The opening 15 also serves for enabling the passage of air into the reservoir, through which the emptying of the reservoir R is facilitated.

Figure 2:
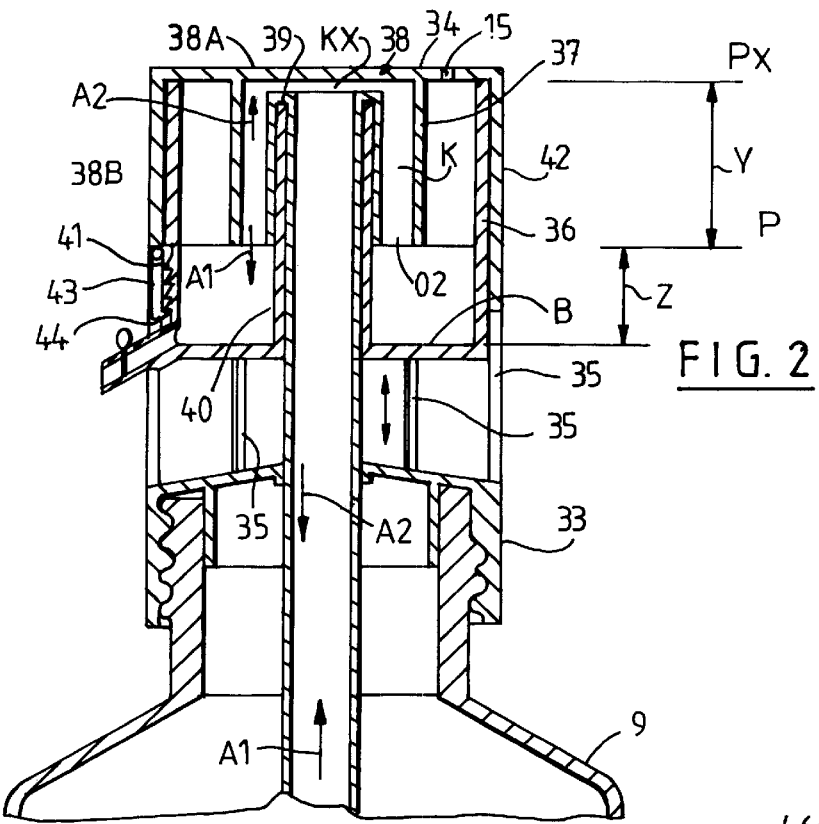
FIG. 2 is a cross-section of a second embodiment of a bottle with a dose measuring apparatus according to the invention.

FIG. 2 shows another embodiment of a dose measuring apparatus according to the invention.

The dose measuring apparatus in FIG. 2 is similar to the dose measuring apparatus in FIG. 1, whereby the volume to be dosed can be adjusted in the reservoir R.

In that embodiment the apparatus is provided with a means for adjusting the level P of the upper opening 02 in relation to the bottom of the reservoir, whereby in the reservoir R, the volume between the bottom B and the upper opening 02 of the channel K is adjusted.

In that embodiment the dose measuring apparatus consists of:
a) a first part 33 that is screwed on to a bottle 9 and that is provided with a pipe 8, with a lid 34 that is connected by legs 35 to the part 33, and
b) a tank 36 which is movable along the pipe 8 between the part 33 and the lid 34.

Through the movement of the tank 36 the distance Z between the level P of the upper opening 02 and the bottom B can be adjusted.

Figure 3:
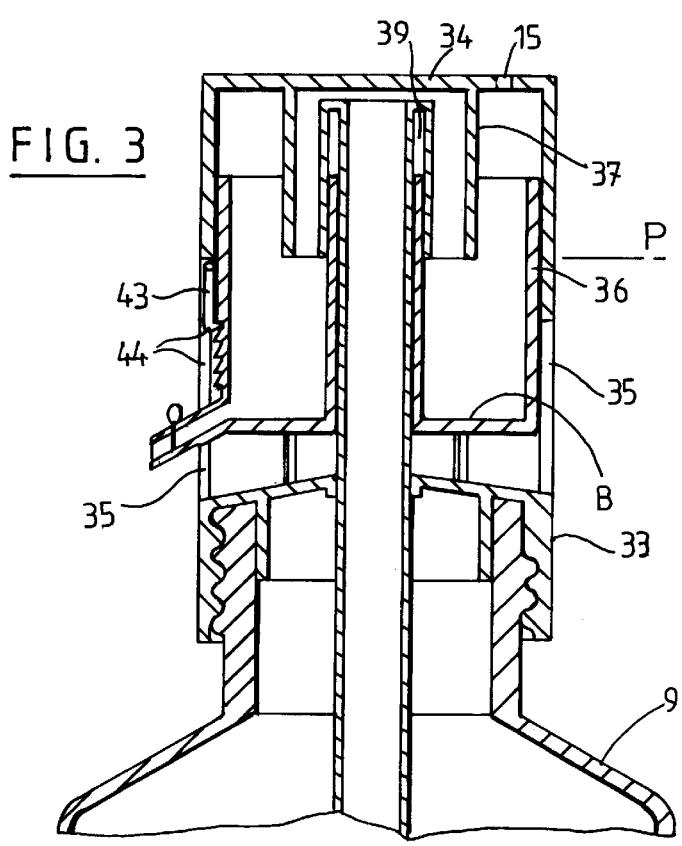
FIG. 3 is a cross-section of the embodiment from FIG. 2 which shows the movement of the bottom of the reservoir.

In FIG. 3 the volume to be dosed is at maximum.

The lid 34 is provided with an inner sleeve 37, while the upper extremity of the pipe 8 is provided with an element 38. This element 38 consists of an upper wall 38A which bears a sleeve 38B, through which between the sleeve 38B and the pipe 8, a slot 39 is formed.

Between the sleeve 38B and the sleeve 37 a part of the channel K is formed, whereby this part is situated above the level P. The distance Y between the upper part KX (level PX) and the level P, remains constant in this embodiment.

The tank 36 is provided with an inner sleeve 40 which is at least partly in the slot 39, in order to prevent the liquid from being able to leak between the tank and the pipe 8.

Here the lid is also provided with an opening 15.

In order to fill the reservoir, for example, the bottle is deformed so that liquid flows from the bottle to the reservoir (A1). As soon as the bottle is no longer subjected to a deforming pressure, the liquid which is located above the level P is removed by suction to the bottle (A2).

A pipe 31 with cutoff means (cock 32) can be used for emptying the reservoir.

Figure 14:
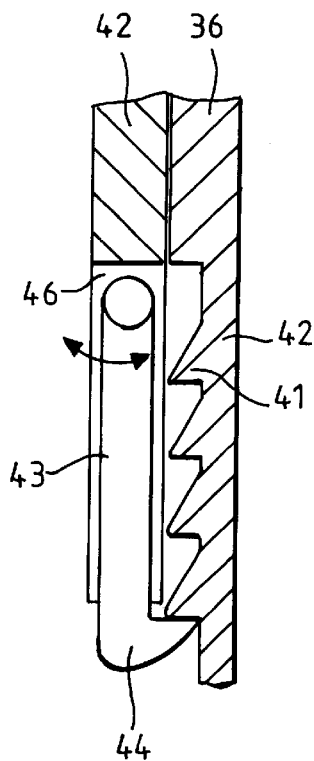
FIG. 14 is a detail from the embodiment from FIG. 2.

Teeth 41 can be provided on the tank 36 in order to hold or maintain the tank in specific positions. For example the outer wall 42 of the lid 36 can be provided with a pivotable arm 43 with a stop 44. (see detail from FIG. 14).

That arm 43 is located in a window 46 of the upper wall 42.

Figure 4:
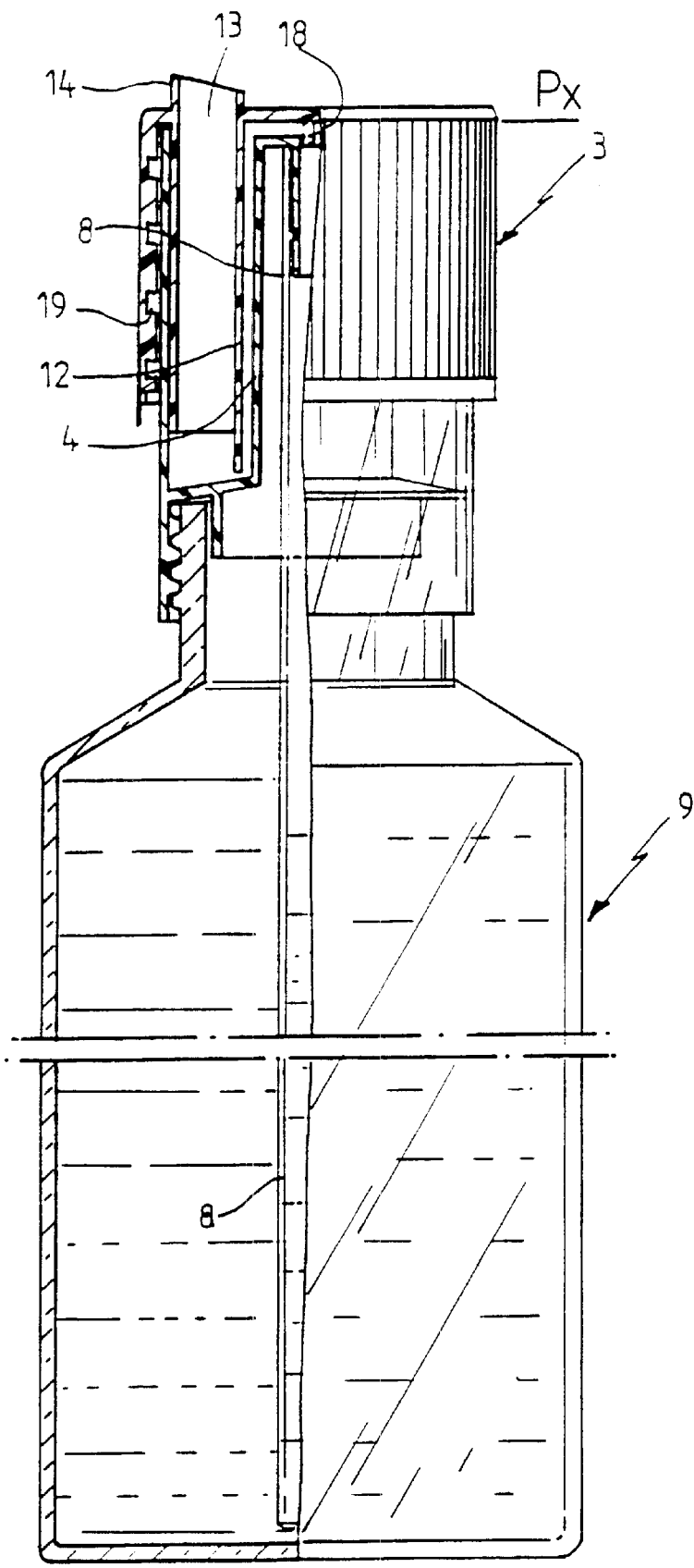
FIG. 4 is in partial cross-section, a dose measuring apparatus according to the invention that is mounted on a bottle.
Figure 6:
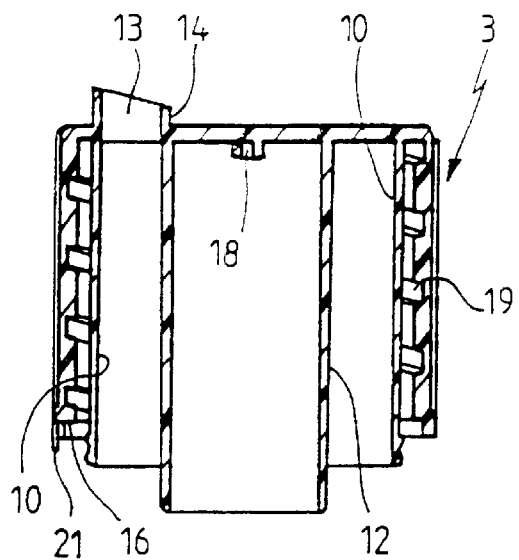
FIG. 6 is a cross-section in longitudinal direction of the upper part of the dose measuring apparatus from FIG. 4.
Figure 7:
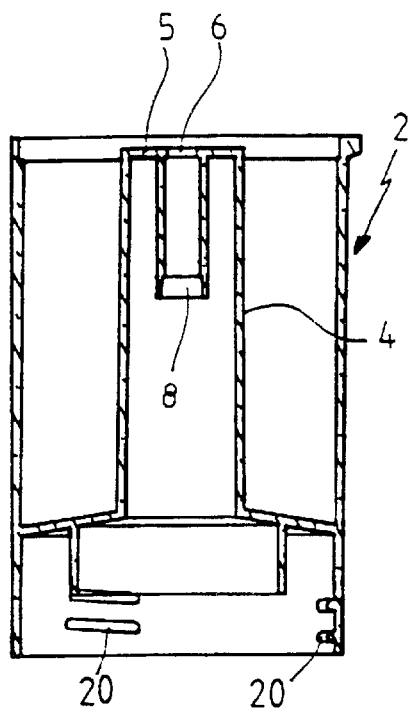
FIG. 7 is a cross-section in longitudinal direction of the lower part of the dose measuring apparatus from FIG. 4.
Figure 5:
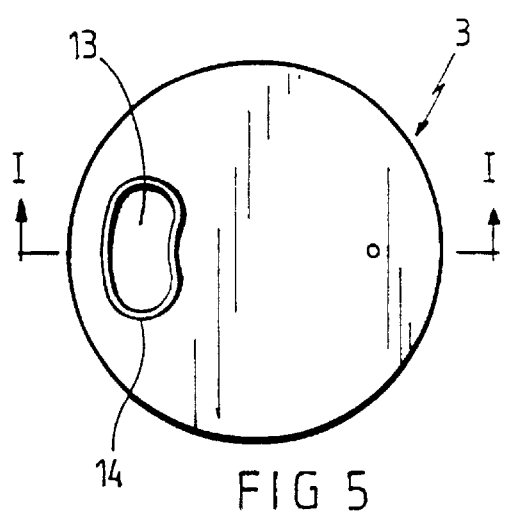
FIG. 5 is a view from above of the apparatus from FIG. 4, seen along the inside.
Figure 8:
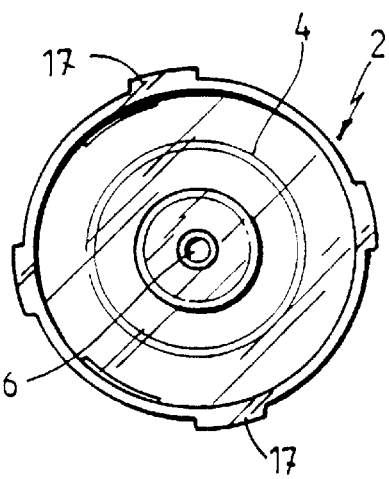
FIG. 8 is a view from above of the lower part represented in FIG. 7.
Figure 9:
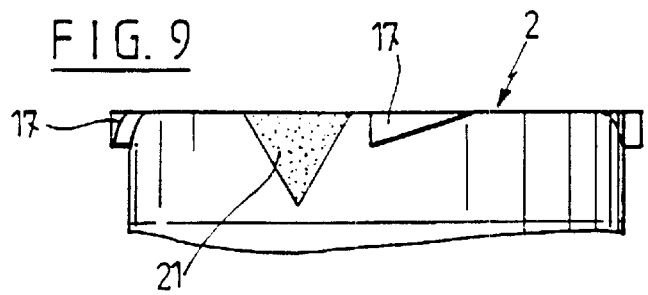
FIG. 9 is a detailed drawing on larger scale of the guiding or the screw thread.
Figure 10:
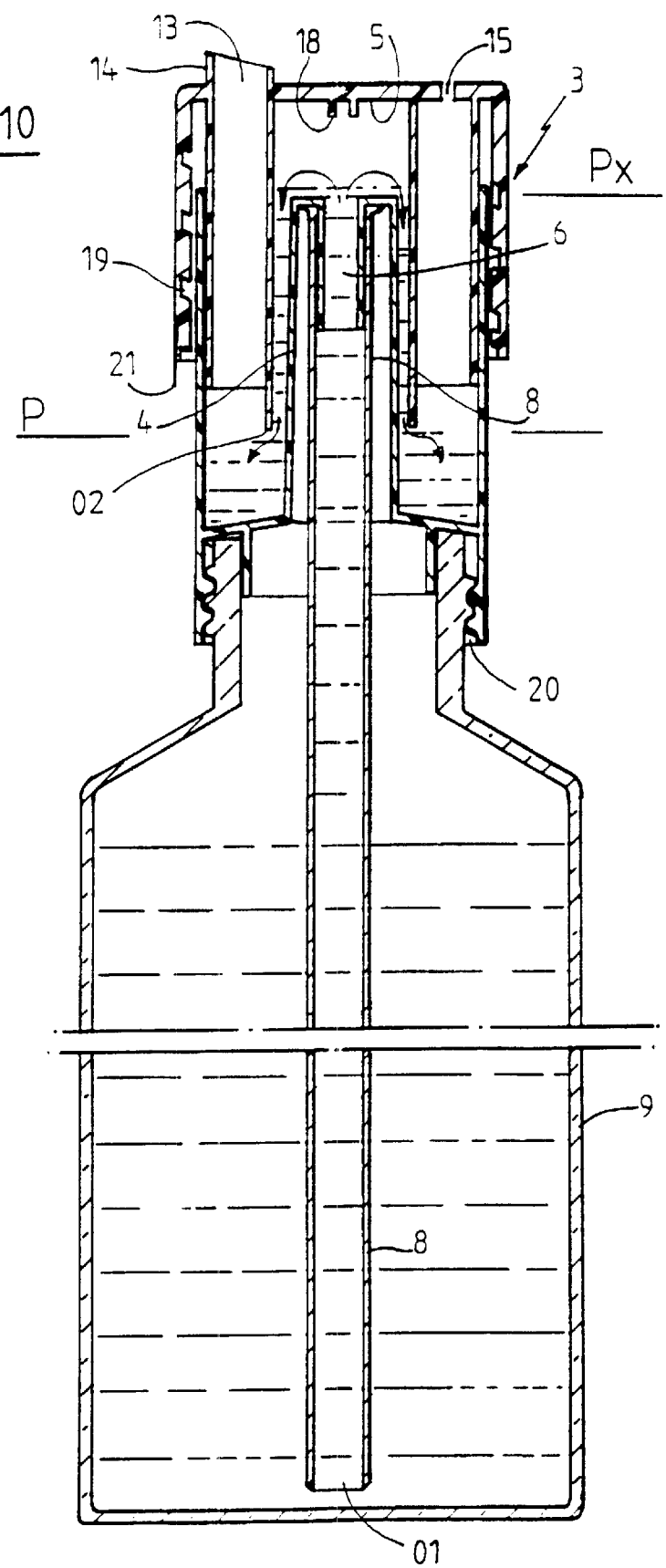
FIG. 10 is a cross-section of the dose measuring apparatus from FIG. 4 in position of smallest dose setting.
Figure 11:
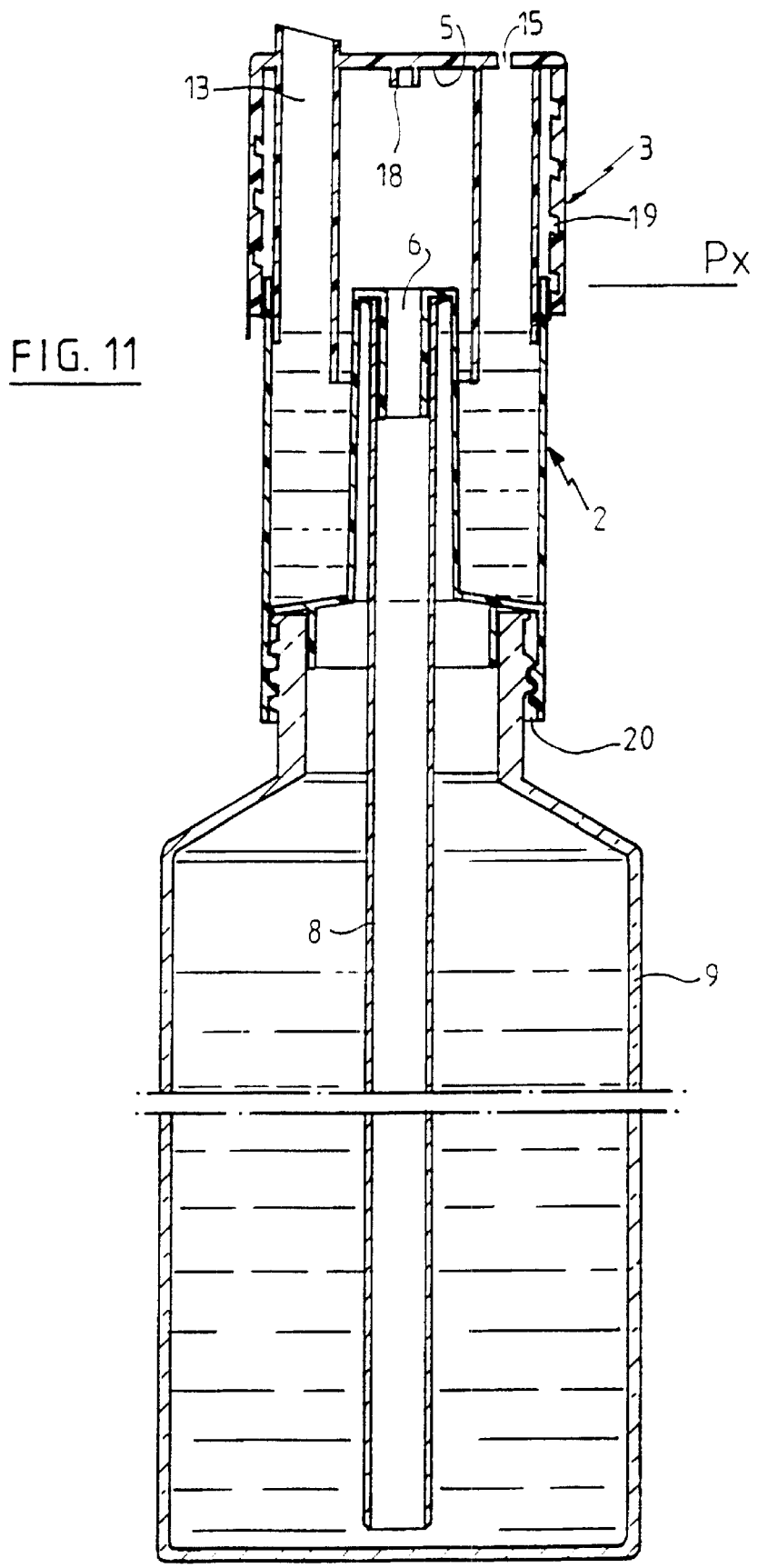
FIG. 11 is a cross-section of the dose measuring apparatus from FIG. 4 of largest dose setting.

In the embodiment of FIG. 4, the dose measuring apparatus 1 for distributing a liquid in predetermined doses, comprises a lower part 2 that serves as reservoir for collecting the amount of liquid to be dosed and a rotatable upper part 3 that is screwed on top of the lower part 2.

The lower part 2 is provided over at least a part of its length with a concentric sleeve 4. The sleeve 4 is closed off on top by an upper plate 5. The upper plate 5 has an opening 6 with a join in which a pipe 8 can be held which reaches to the bottom of the bottle 9 (FIGS. 1 and 2).

The rotatable upper part 3 has an internal screw thread 10 with a concentric casing 12 which fits round the concentric sleeve 4 of the lower part 2 and serves as channelling for the liquid in and out of the lower part, namely the reservoir R. By manually turning the screw sleeve 10 to the left or right, the upper part 3 slides downwards and back upwards over the sleeve 4 through which liquid is pressed out of the bottle 9, through the pipe 8 and the opening 6 of the upper plate 5 into the reservoir of the sleeve 4 by manual pressure on the wall of the bottle. Through the manual pressure on the bottle wall the lower part 2, which serves as reservoir, is filled to above the set dose value. Through the pressure developed in the bottle the level of liquid is sucked back into the bottle until this reaches the concentric sleeve 12. Hereafter the removal by suction of the liquid stops, and the underpressure still to be equalised is restored by sucking in air. Via the pouring orifice of the upper part the liquid present in the reservoir can be poured away.

The pouring orifice 13 of the upper part 3 is fitted with a spout 14. The lower part 2 has in the middle a cylindrical sleeve 4 with an opening 6 on top, which reaches the bottom of the bottle by a pipe 8. The upper part 3 comprises a concentric sleeve 12 in the middle.

Grooves 16 on the screw thread 19 of the screw sleeve 10 ensure the desired dose volume. They enable various dose settings to be obtained step by step with great accuracy. This accuracy is enhanced by a built-in click position.

The lower part 2 is attached to the bottle by means of a second screw thread 20 or a snap connection.

The zero position and the maximum dose setting are shown on the upper part 3 and on the lower part by identifying marks. Depending on the applications a large number of dose settings can be provided. The distance Y between the level PX (of the upper part of the channel or of the opening 6) and the level of the upper opening 02 varies for example between a minimum value (e.g. 0.3 to 0.7 cm) for a maximum volume to be dosed and a maximum value (e.g. 3 to 6 cm) for a minimum volume to be dosed.

The upper part 3 bears a conoid 18 inside on top, which when it is completely screwed down on to the lower part 2 of the dose measuring apparatus, can hermetically seal off the only passage of the lower part 2, so that possible volatile substances have no chance of evaporating and are not lost.

Figure 12:
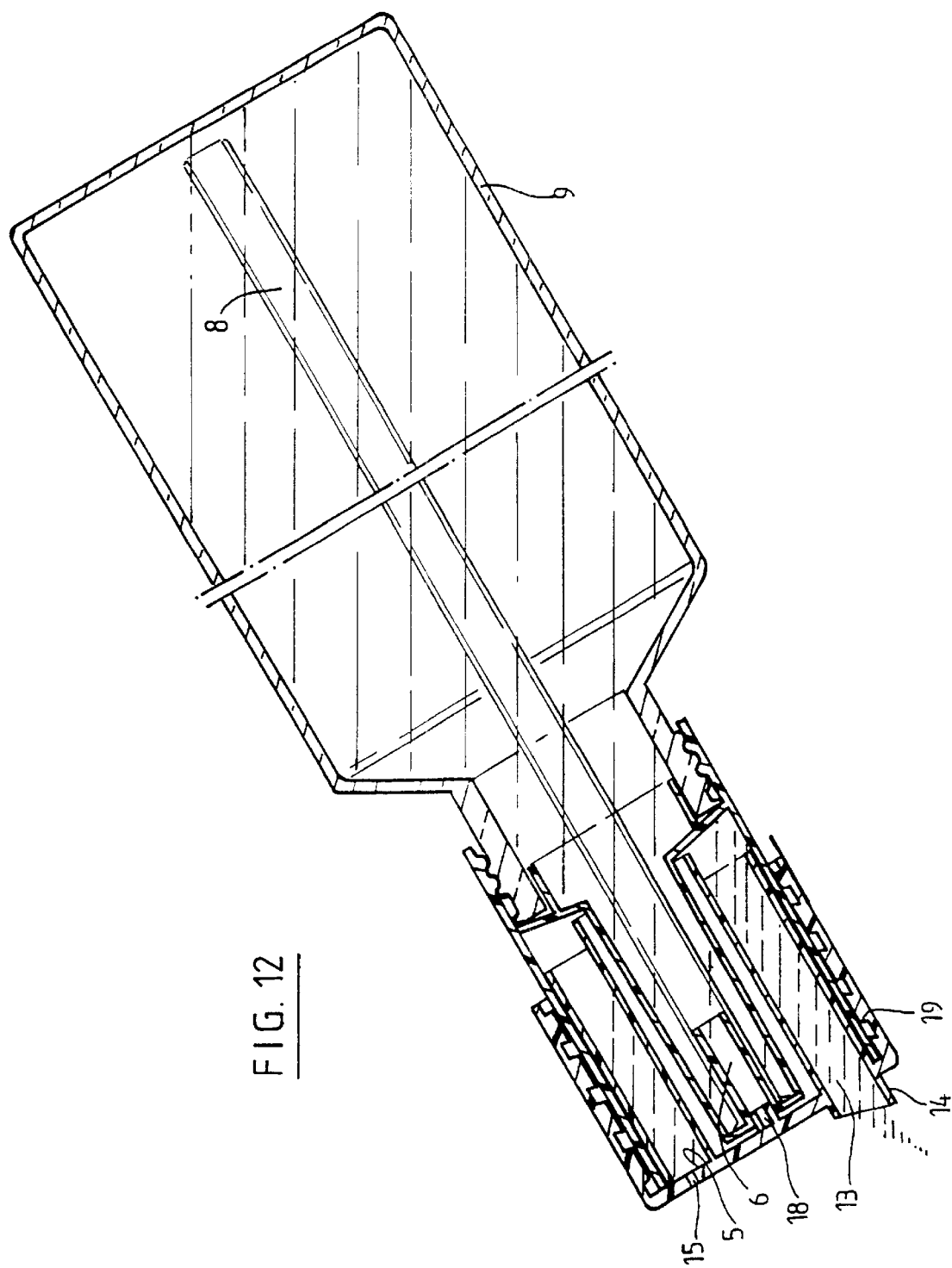
FIG. 12 is a side view of the dose measuring apparatus from FIG. 4 during its operation as pouring can.

The upper part 3 comprises a pouring orifice 13 and a hole 15 opposite this orifice 13, in order to facilitate the pouring (FIG. 12).

The lower part 2 has a bottom part disposed obliquely upwards that runs towards the lower cylindrical sleeve 4, through which a very small dose can already be obtained.

The outer wall of the screw sleeve 10 connects to the inner wall of the lower part 2, and the inner sleeve 4 serves as guide round the cylindrical sleeve 12 of the upper part 3, along which the liquid in the reservoir is sent, and in case of overdosing is sucked along the same way back into the bottle 9.

The rotatable upper part 3 and the lower part 2 are, for example, manufactured out of injection moulded parts.

With an identifying mark 21 on the rotatable upper part 3 the stop position, maximum position and the other dose settings corresponding to the engraving in the lower part 2 are shown opposite each other on the printing on the lower part 2.

The lower part 2 has teeth 17 on the upper edge of the cuter periphery, which through the turning to the left or right of the upper part 3, give rise to a click position each time when the tooth 17 reaches a groove 16 along the screw thread 19 of the upper part 3.

Figure 13:
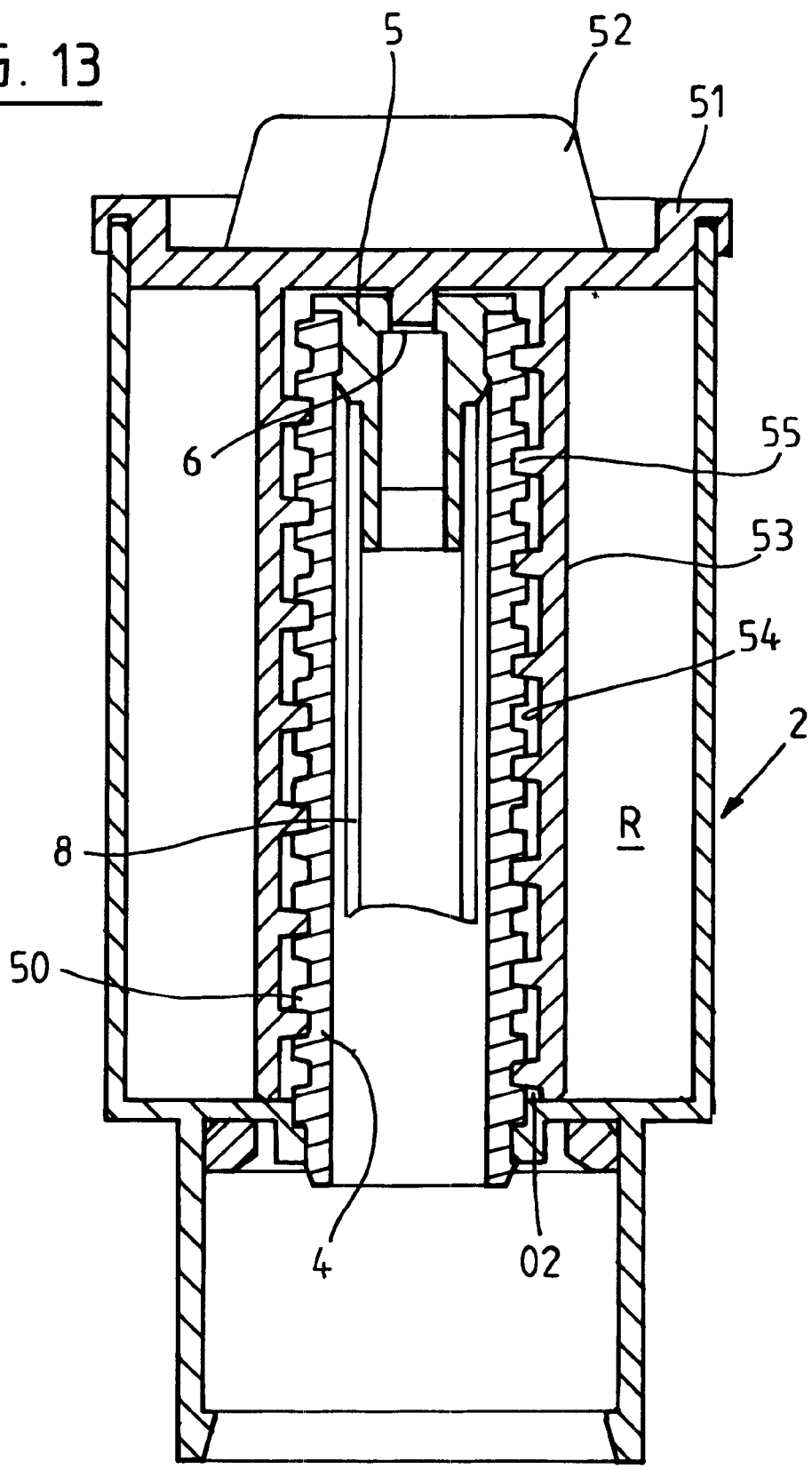
FIG. 13 is a cross-section of an additional embodiment of a dose measuring apparatus according to the invention.

FIG. 13 shows an additional embodiment of a dose measuring device according to the invention.

This apparatus consists of a lower part 2 that is similar to the lower part 2 of the apparatus from FIG. 4 and upper part 3.

The inner sleeve 4 of the lower part 2 is provided with a screw thread 50.

The rotatable upper part 3 consists of a lid 51 with a plate 52 for manually turning the lid in relation to the lower part.

The lid bears a sleeve 53 whose inner wall 54 is provided with a screw thread 55, whereby the screw thread 55 is in the grooves of the screw thread 50.

By unscrewing the lid, the lid is moved upwards in relation to the lower part 2. Because of this the channel K becomes open for the passage of liquid.

This channel is formed by the pipe 8, by the opening 6 in the upper wall 5 of the sleeve 4, by the chamber which is defined between the upper wall 5 and the lid, and by a spiral channel that is formed between the screw threads 55 and 50.

By moving the lid upwards, the upper opening 02 is brought upwards, through which the volume to be dosed in the reservoir is increased.

As soon as the lid is unscrewed, the lid no longer closes off the lower part.

What is claimed is:

1. Dose measuring apparatus for dosing a liquid contained in a bottle, said apparatus comprising:
a) a means for hermetically mounting the apparatus on a bottle,
b) a pipe having a first open extremity and a second open extremity,
c) a cylindrical lower part, and
d) a cylindrical upper part,
whereby the first extremity of the pipe is designed to be inserted into the liquid contained in the bottle,
whereby the cylindrical lower part forms a reservoir having a bottom, a cylindrical outer sleeve and an inner sleeve, said inner sleeve having an opening for allowing the liquid through, whereby said opening communicates with the second open extremity of the pipe,
whereby the cylindrical upper part is rotatably mounted on the cylindrical lower part and comprises a cylindrical outer sleeve and a concentric inner sleeve with a lower open extremity and an upper closed extremity,
whereby the inner sleeve of the lower part is at least partially inserted in the inner sleeve of the upper part,
wherein the opening for allowing the liquid through of the inner sleeve of the cylindrical lower part is situated on top of the inner sleeve of the lower part,
a passage is formed between the inner sleeve of the lower part and the inner sleeve of the upper part, and
The cylindrical upper part is connected to the lower part by a screw mechanism, so that when the upper part is rotated with respect to the lower part, the inner sleeve of the upper part moves upwardly or downwardly along the inner sleeve of the lower part, thereby adjusting the level of the lower open extremity of the inner sleeve of the upper part with respect to the bottom of the reservoir, the apparatus thus comprising a channel between the first open extremity of the pipe and the reservoir, said channel having a first part being formed by the pipe and a second part being formed by the passage between the inner sleeve of the lower part and the inner sleeve of the upper part, so that, when the apparatus is mounted on a bottle, through an exertion of a pressure in the bottle or of an underpressure in the reservoir, liquid flows from the bottle through the channel to the reservoir, while as soon as or after this pressure or underpressure is no longer exerted, the liquid which is in the reservoir above the level of the lower open extremity of the inner sleeve of the upper part is removed by suction to the bottle via the passage formed between the two inner sleeves and by the pipe, so that after that removal by suction, an accurate volume of liquid in the reservoir is determined between the bottom of the reservoir and the level of the lower open extremity of the inner sleeve of the upper part.

2. Apparatus according to claim 1, wherein the first extremity of the pipe is provided with a U-shaped notch.

3. Apparatus according to claim 1, wherein the bottom of the reservoir is upwardly oblique from the outer sleeve of the reservoir towards the inner sleeve of the reservoir.

4. Apparatus according to claim 1, wherein the means for hermetically mounting the apparatus on a bottle comprises a screw or snap connection.

5. Apparatus according to claim 1, wherein the upper and lower parts are injection moulded.

6. Apparatus according to claim 1, wherein the upper part and the lower part include identification marks corresponding to different dose settings.

7. Bottle provided with an apparatus according to claim 1.

8. Apparatus according to claim 1, wherein said apparatus comprises means to prevent the flow of liquid from the bottle to the reservoir.

9. Apparatus according to claim 8, wherein the closed extremity of the inner sleeve of the upper part is provided with a conoid for hermetically sealing of the opening on top of the inner sleeve of the lower part.

10. Apparatus according to claim 1, wherein the upper part is provided with a pouring orifice.

11. Apparatus according to claim 10, wherein the upper part is further provided with a hole opposite the pouring orifice to facilitate the pouring.

12. Apparatus according to claim 10, wherein the pouring orifice is provided with a spout.

13. Apparatus according to claim 1, wherein the outer sleeve of the lower part connects to the outer sleeve of the upper part.

14. Apparatus according to claim 13, wherein the outer sleeve of the upper part is provided with a screw thread which cooperates with at least one tooth provided on the outer sleeve of the lower part.

15. Apparatus according to claim 14, wherein the screw thread is provided with grooves, whereby when a tooth touches a groove, a specific dosage volume is defined in the reservoir.

* * * * *

UNITED STATES PATENT AND TRADEMARK OFFICE
CERTIFICATE OF CORRECTION

PATENT NO. : 6,334,550 B1
DATED : January 1, 2002
INVENTOR(S) : De Backer

It is certified that error appears in the above-identified patent and that said Letters Patent is hereby corrected as shown below:

Title page,
Please correct to read: -- [22] PCT Filed: Apr. 27, 1998 --

Signed and Sealed this

Twenty-first Day of May, 2002

Attest:

JAMES E. ROGAN
*Attesting Officer*    *Director of the United States Patent and Trademark Office*